United States Patent
Ospici

(10) Patent No.: US 12,518,504 B2
(45) Date of Patent: Jan. 6, 2026

(54) METHOD FOR CALIBRATING AN OBJECT RE-IDENTIFICATION SOLUTION IMPLEMENTING AN ARRAY OF A PLURALITY OF CAMERAS

(71) Applicant: BULL SAS, Les Clayes-sous-Bois (FR)

(72) Inventor: Matthieu Ospici, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 542 days.

(21) Appl. No.: 17/961,510

(22) Filed: Oct. 6, 2022

(65) Prior Publication Data

US 2023/0111927 A1    Apr. 13, 2023

(30) Foreign Application Priority Data

Oct. 12, 2021 (EP) .................................... 21306427

(51) Int. Cl.
*G06K 9/00* (2022.01)
*G06T 7/70* (2017.01)
(Continued)

(52) U.S. Cl.
CPC .............. *G06V 10/255* (2022.01); *G06T 7/70* (2017.01); *G06V 10/22* (2022.01); *G06V 10/70* (2022.01);
(Continued)

(58) Field of Classification Search
CPC ...... G06V 10/20; G06V 10/22; G06V 10/225; G06V 10/25; G06V 10/255; G06V 10/40;
(Continued)

(56) References Cited

U.S. PATENT DOCUMENTS 9,633,263 B2 * 4/2017 Brown .................. G06V 20/52
10,282,616 B2 * 5/2019 Gong .................. G06V 40/173
(Continued)

FOREIGN PATENT DOCUMENTS

GB    2519348 A    4/2015

OTHER PUBLICATIONS

D.N. Truong Cong, L. Khoudour, C. Achard, C. Meurie, O. Lezoray, "People re-identification by spectral classification of silhouettes", Signal Processing, vol. 90, Issue 8, Aug. 2010, pp. 2362-2374 (Year: 2010).*

(Continued)

*Primary Examiner* — Eric Rush
(74) *Attorney, Agent, or Firm* — ARC IP Law, PC; Joseph J. Mayo

(57) ABSTRACT

The invention includes a method for calibrating an object re-identification solution implementing an array of several cameras. For at least one pair of two cameras from among the several camera, the method includes detecting objects in images taken by each of the two cameras, and computing a normalized distance between a digital signature of each object detected by one of the two cameras, and that of each different object detected by the other one of the two cameras. The method also includes determining, as a function of said normalized distances, a distance threshold, called re-identification threshold, that will be used for re-identifying objects in the images taken by the two cameras. The invention also includes a computer program and a device implementing such a calibration method, and a method and a system for re-identifying individuals calibrated by such a calibration method.

9 Claims, 3 Drawing Sheets

(51) Int. Cl.
*G06V 10/20* (2022.01)
*G06V 10/22* (2022.01)
*G06V 10/70* (2022.01)
*G06V 10/74* (2022.01)
*G06V 10/776* (2022.01)
*G06V 20/52* (2022.01)
*G06V 40/16* (2022.01)

(52) U.S. Cl.
CPC .......... *G06V 10/761* (2022.01); *G06V 10/776* (2022.01); *G06V 20/52* (2022.01); *G06V 40/173* (2022.01)

(58) Field of Classification Search
CPC ...... G06V 10/44; G06V 10/46; G06V 10/462; G06V 10/464; G06V 10/50; G06V 10/70; G06V 10/74; G06V 10/75; G06V 10/751; G06V 10/758; G06V 10/761; G06V 10/762; G06V 10/764; G06V 10/765; G06V 10/77; G06V 10/776; G06V 10/82; G06V 10/96; G06V 20/40; G06V 20/52; G06V 20/58; G06V 20/60; G06V 20/64; G06V 20/70; G06V 20/80; G06V 40/10; G06V 40/103; G06V 40/16; G06V 40/172; G06V 40/173; G06V 40/18; G06V 2201/07; G06T 7/70; G06T 7/80; G06T 2207/10004; G06T 2207/10016; G06T 2207/20081; G06T 2207/20084; G06T 2207/30196; G06T 2207/30201; G06T 2207/30232; G06F 18/20; G06F 18/21; G06F 18/211; G06F 18/213; G06F 18/2132; G06F 18/21322; G06F 18/2134; G06F 18/21342; G06F 18/21343; G06F 18/217; G06F 18/2193; G06F 18/22; G06F 18/24; G06F 18/245; G06F 18/2451; G06F 18/2453

USPC ................ 382/100, 103, 104, 106, 107, 110, 382/115–118, 153–157, 159, 160, 165, 382/173, 181, 190, 191, 195, 199, 203, 382/209, 217, 224–229, 278, 294, 300, 382/312, 325; 348/61, 77, 143, 144, 348/148–157, 159, 161, 169–172
See application file for complete search history.

(56) References Cited

U.S. PATENT DOCUMENTS

| | | | |
|---|---|---|---|
| 2011/0021368 A1* | 1/2011 | Tammero | G16B 40/10 435/6.12 |
| 2012/0026335 A1* | 2/2012 | Brown | G06T 7/292 382/103 |
| 2013/0343642 A1* | 12/2013 | Kuo | G06V 10/56 382/159 |
| 2018/0286081 A1* | 10/2018 | Koperski | G06V 20/52 |
| 2020/0184256 A1* | 6/2020 | Ye | G06V 20/52 |

OTHER PUBLICATIONS

European Search Report issued in EP21306427, dated Mar. 31, 2022 (2 pages).
Wang, et al., "Faster Person Re-Identification", Aug. 16, 2020, Computer Vision ECCV 2020.
Alqahtani, et al., "An introduction to Person Re-identification with Generative Adversarial Networks", Apr. 12, 2019, Cornell University Library.
"YOLOV5" by Ultralytics retrieved from https://pytorch.org/hub/ultralytics_yolov5/ on Oct. 4, 2022.
"Scipy.Interpolate.interp1d" interpolation function, retrieved from https://docs.scipy.org/doc/scipy/reference/generated/scipy.interpolate.interp1d.html on Oct. 4, 2022.

* cited by examiner

METHOD FOR CALIBRATING AN OBJECT RE-IDENTIFICATION SOLUTION IMPLEMENTING AN ARRAY OF A PLURALITY OF CAMERAS

This application claims priority to European Patent Application Number 21306427.2, filed 12 Oct. 2021, the specification of which is hereby incorporated herein by reference.

BACKGROUND OF THE INVENTION

Field of the Invention

The invention relates to a method for calibrating an object re-identification solution implementing an array of a plurality of cameras. It also relates to a computer program and a device implementing such a calibration method, and to a method and a system for re-identifying individuals calibrated using such a calibration method.

The field of the invention generally relates to the field of re-identifying objects in images taken by a plurality of cameras, and more specifically to the field of re-identifying individuals in images taken by a plurality of cameras.

Description of the Related Art

In many fields, being able to automatically recognize an individual through images or videos provided by various cameras is highly useful.

In summary, individuals are re-identified as follows. An individual is detected in a first image provided by a first camera and a first signature is computed for this individual, for example, by a previously trained neural network. Subsequently, an individual is detected in a second image provided by a second camera and a second signature is computed for this individual by the same neural network. Then, a distance is computed between the first and second signatures, such as a cosine distance or a Euclidean distance. This distance is compared with a predetermined threshold, called re-identification threshold in the one or more embodiments of the invention, in order to decide whether the individuals detected in the first and second images are actually the same individual or not.

It is understood that selecting the re-identification threshold is very important. An excessively high re-identification threshold will generate many false positives, whereas an excessively low re-identification threshold will lead to many false negatives. It is therefore important to be able to determine a re-identification threshold value that is as accurate as possible. However, an effective technique does not currently exist for accurately determining the re-identification threshold value in a multi-camera system for re-identifying individuals.

One aim of the invention is to solve at least one of the drawbacks of the state of the art.

A further aim of the invention is to propose a more accurate calibration of a multi-camera method and/or system for re-identifying objects.

A further aim of the invention is to propose a more accurate calibration customizable calibration of a multi-camera method and system for re-identifying objects.

BRIEF SUMMARY OF THE INVENTION

At least one embodiment of the invention proposes achieving at least one of the aforementioned aims using a method for calibrating an object re-identification solution implementing an array of a plurality of cameras, said method comprising the following steps carried out for at least one pair of two cameras from among said cameras:

detecting objects in images taken by each of the two cameras;

computing a normalized distance between a digital signature of each object detected by one of the two cameras, and that of each different object detected by the other one of the two cameras; and determining, as a function of said normalized distances, a distance threshold, called re-identification threshold, that will be used for re-identifying objects in the images taken by said two cameras.

Thus, at least one embodiment of the invention proposes determining an object re-identification threshold on images taken by an array of cameras by taking the cameras in pairs. In other words, in the method according to one or more embodiments of the invention, the cameras of the array of cameras are considered in pairs and a re-identification threshold is defined for each combination of two cameras: this re-identification threshold is used to determine whether two objects detected by these two cameras are the same object or not. Thus, by defining an individual re-identification threshold for each combination of two cameras, the differences between these cameras can be taken into account for re-identification, for example, differences in the field of view, differences in lighting, etc. Thus, at least one embodiment of the invention allows more accurate and effective calibration to be carried out, reducing the number of false positives and false negatives.

Furthermore, the solution proposed by one or more embodiments of the invention allows individual re-identification thresholds to be determined for each combination of cameras, which allows the calibration to be customized and therefore easily adapted to any re-identification solution, irrespective of its architecture, or in the event of the replacement of one of the cameras, for example, following maintenance.

In at least one embodiment of the invention, "object re-identification" in images is understood to mean the re-identification of an individual, an animal or even an object, such as, for example, a vehicle, in images provided by various cameras.

In one or more embodiments of the invention, "pair of cameras" is understood to mean combining one camera of the array of cameras with another camera of said array of cameras. Within the meaning of one or more embodiments of the invention, when the array comprises K cameras, with $K \geq 2$, then there are $(K \times (K-1))/2$ pairs of cameras. In other words, each camera of the array of cameras can be associated with each of the other cameras in order to obtain as many pairs of cameras.

According to one or more embodiments, the step of determining the re-identification threshold for a pair of cameras can comprise the following steps:

computing, as a function of the normalized distances, a plurality of false positive rates each associated with a normalized distance threshold;

determining, by interpolating said false positive rates and normalized distance thresholds, a function linking the false positive rate to the normalized distance threshold; and computing said re-identification threshold by said function taking a predetermined false positive rate as input.

For example, the distances can be normalized between 0 and 1, such that a distance of 0 corresponds to a total identity of digital signatures and a distance of 1 corresponds to the greatest distance between two digital signatures.

Thus, a false positive rate can be determined for various distance thresholds, for example, in steps of 0.1 starting from 1: a first false positive rate can be computed for a normalized distance threshold of 0.9, another for a normalized distance threshold of 0.8, and so on. Of course, this example is provided for purposes of illustration only.

For a normalized distance threshold, for example, of 0.8, the false positive rate corresponds to the number of couples of images for which the computed normalized distance between their signatures is greater than or equal to said normalized distance threshold. Consequently, determining the false positive rate for a normalized distance threshold can be carried out by counting these couples of images.

Advantageously, in at least one embodiment, the function can be determined by univariate interpolation linking the normalized distance threshold to the false positive rate, such that:

$$\Gamma = f(RFP),$$

where $\Gamma$ is the distance threshold, and RFP is the false positive rate and f is the function.

Such a function can be a linear function.

The univariate interpolation can be any type of interpolation carried out by any interpolation function taking into account the couples of values {distance threshold; number of false positives}. For example, univariate interpolation can be carried out by the interpolation function described on SciPy for scipy.interpolate under interp1d.

Advantageously, the calibration method according to one or more embodiments of the invention can comprise, prior to the step of computing distance, a step indicating whether two objects detected by the cameras of the pair of cameras are the same object or not.

In other words, this step involves determining whether two images taken by two different cameras correspond to the same object.

Such a step can be carried out manually by an operator presented with the images in pairs, for example.

According to one or more embodiments, for at least one image, the step of detecting an object uses an object detector to extract an area of said image comprising said object, and in particular each area of the image comprising an object.

It is this area that is subsequently used to compute the digital signature of the object.

Detecting an area comprising an object can be carried out using any technique known to a person skilled in the art. According to at least one embodiment, the detection of one, preferably each, area of an image comprising an object can be carried out by a detector of the YOLOv5 type, for example, described by PyTorch.

According to one or more embodiments, at least one digital signature of an object can be computed by a generator comprising a previously trained neural network.

The neural network used to provide a digital signature of an object appearing in an image can be a convolutional neural network. In particular, the neural network can be a CNN, of the Resnet type, for example.

The neural network can comprise 50 layers.

The neural network can be trained by a gradient backpropagation algorithm on a training base comprising a multitude of images for which the nature of the object they contain is annotated and entered into the neural network.

Advantageously, the calibration method according to one or more embodiments of the invention can be carried out for each camera of the array taken as pairs with each of the other cameras of said array, so as to obtain a re-identification threshold for each pair of cameras.

Thus, if the array of cameras comprises K cameras, denoted $C_1$ to $C_K$, then a re-identification threshold $SR_{i,j} = SR_{j,i}$ is determined for the pair of cameras $\{C_i, C_j\}$, with $i \neq j$ and $i \leq K$ and $j \leq K$, so that a total of $(N*(N-1))/2$ different re-identification thresholds is obtained.

According to at least one embodiment in which the array of cameras comprises 5 cameras, 10 re-identification thresholds are obtained, namely $SR_{1,2}$, $SR_{1,3}$, $SR_{1,4}$, $SR_{1,5}$, $SR_{2,3}$, $SR_{2,4}$, $SR_{2,5}$, $SR_{3,4}$, $SR_{3,5}$ and $SR_{4,5}$.

According to at least one embodiment of the invention, the calibration method can be applied to the re-identification of individuals.

According to at least one embodiment of the invention, a computer program is proposed comprising executable instructions, which, when they are executed by a computer device, carry out all the steps of the calibration method according to one or more embodiments of the invention.

The computer program can be in any computer language, such as, for example, in machine language, in C, C++, JAVA, Python, etc.

According to at least one embodiment of the invention, a calibration device is proposed comprising means configured to carry out all the steps of the calibration method according to one or more embodiments of the invention.

The calibration device can be any type of appliance such as a server, a computer, a tablet, a calculator, a processor, a computer chip, programmed to implement the calibration method according to one or more embodiments of the invention, for example, using the computer program according to at least one embodiment of the invention.

According to at least one embodiment of the invention, a method is proposed for re-identifying an object in images taken by an array of a plurality of cameras, said method using at least one re-identification threshold associated with a pair of cameras of said array of cameras, determined using a calibration method according to one or more embodiments of the invention.

The method according to at least one embodiment of the invention can be used for re-identifying individual(s) in images provided by various cameras.

The method according to one or more embodiments of the invention can be used for re-identifying non-human object(s), such as a car, in images.

According to at least one embodiment of the invention, a system is proposed for re-identifying an object comprising an array of a plurality of cameras, said system using at least one re-identification threshold associated with a pair of cameras of said array of cameras, determined using a calibration method according to one or more embodiments.

The system according to at least one embodiment of the invention can be used for re-identifying individual(s) in images provided by various cameras.

The system according to one or more embodiments of the invention can be used for re-identifying non-human object(s), such as a car, in images.

BRIEF DESCRIPTION OF THE DRAWINGS

Further advantages and features will become apparent from studying the detailed description of one or more embodiments, and from the accompanying drawings, in which.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior art. This selection comprises at least one preferably functional feature which is free of structural details, or only has a portion of the structural details if this portion alone is sufficient to confer a technical benefit or to differentiate the one or more embodiments of the invention with respect to the prior art.

In particular, the one or more embodiments can be combined with each other if there is no technical obstacle to this combination.

In the figures and in the remainder of the description, the same reference has been used for the features that are common to several figures.

Figure 1:
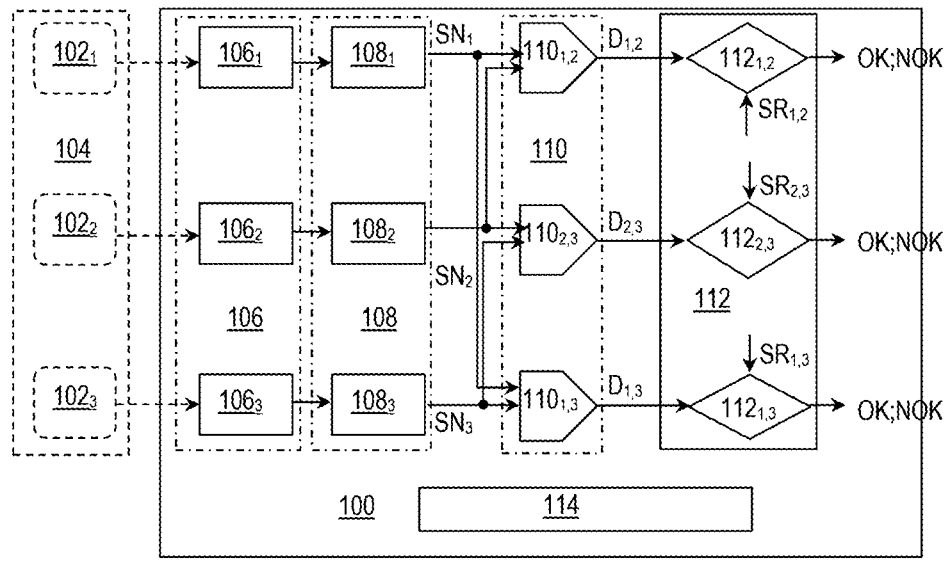
FIG. 1 is a schematic representation of re-identification system according to one or more embodiments of the invention.

FIG. 1 is a schematic representation of a re-identification system according to one or more embodiments of the invention.

The re-identification system 100 of FIG. 1 can be used for re-identifying any type of object, such as individuals, animals, vehicles, etc. Hereafter, in a non-limiting manner, at least one embodiment of the invention is considered to be implemented for re-identifying individuals.

The system 100 is used for re-identifying individuals from video streams originating from an array of K cameras $102_1$-$102_K$ distributed in space and forming an array 104 of cameras, with K≥2. The array 104 of cameras may or may not form part of the system 100. Each camera $102_i$ is provided in order to take images, and in particular video streams. In the example shown, and in a not at all limiting manner, K=3.

Each image of an image stream taken by a camera $102_i$ can be analyzed. Alternatively, only one image every E seconds can be processed. For example, E=5 seconds.

The system 100 comprises, for each camera $102_1$-$102_3$, an individual detector, respectively $106_1$-$106_3$, in each processed image. Each individual detector $106_1$-$106_3$ can be a yolov5 type detector previously trained for detecting individuals. Each detector $106_1$-$106_3$ allows one or more individual(s) to be detected in an image, and allows, for each detected individual, the area of the image comprising said individual to be isolated and supplied. Generally, the individual area is a rectangular area comprising said individual. Of course, the system 100 can comprise a single detector 106 used, in turn, for each camera $102_1$-$102_3$, or by each processed image originating from the cameras $102_1$-$102_3$.

The system 100 comprises, for each camera $102_1$-$102_3$, a signature generator, respectively $108_1$-$108_3$, which takes an image as input, and in particular an area of an image comprising an individual, and provides a digital signature as output, denoted SN, for this individual or image area. Each signature generator $108_1$-$108_3$ can conventionally comprise a previously trained CNN neural network. Of course, the system 100 can comprise a single signature generator 108 used, in turn, for each camera $102_1$-$102_3$, or each image area.

The system 100 further comprises, for each pair of cameras $\{102_i, 102_j\}$, a computer, respectively $110_{1,2}$, $110_{1,3}$ and $110_{2,3}$, for computing the distance, denoted $D_{1,2}$, $D_{1,3}$ and $D_{2,3}$, for example, the cosine distance, between:

a digital signature, denoted SNi, generated for an individual detected in an image taken by a camera $102i$; and a digital signature, denoted SNj, generated for an individual detected in an image taken by a camera $102_j$;

where i≠j, and j≤K. The computed distance can be a normalized distance with a value ranging between 0 and 1. Of course, alternatively, a single computer 110 can be used, in turn, for cameras taken in pairs.

The system 100 further comprises a comparator $112_{i,j}$ configured to compare the computed distance $D_{i,j}$ between two individuals detected on two cameras $102_i$ and $102_j$ with a re-identification threshold, denoted $SR_{i,j}$, predetermined by the calibration method according to one or more embodiments of the invention, for the pair formed by said cameras ($102_i$, $102_j$). In other words, the re-identification threshold associated with the pair of cameras ($102_i$, $102_j$) is specific to this pair of cameras ($102_i$, $102_j$) and is different from the re-identification threshold, denoted $SR_{i,l}$ associated with the pair of cameras ($102_i$, $102_l$). If the computed distance $D_{i,j}$ is below the re-identification threshold $SR_{i,j}$, then it is the same individual in the two images taken by the two cameras $102_i$ and $102_j$; otherwise, it is two different individuals. Of course, alternatively, a single comparator 112 can be used, in turn, for all the cameras taken in pairs.

The system 100 can comprise a calibration device, referenced 114 and highly schematically shown in FIG. 1, for determining each re-identification threshold for each pair of cameras, namely:

the re-identification threshold $SR_{1,2}$ associated with the pair of cameras $102_1$ and $102_2$;

the re-identification threshold $SR_{1,3}$ associated with the pair of cameras $102_1$ and $102_3$; and the re-identification threshold $SR_{2,3}$ associated with the pair of cameras $102_2$-$102_3$.

A non-limiting example of such a calibration device according to one or more embodiments of the invention will be described below, with reference to FIG. 4.

The calibration device can be integrated into the system 100, or can be in the form of an individual device.

Figure 2:
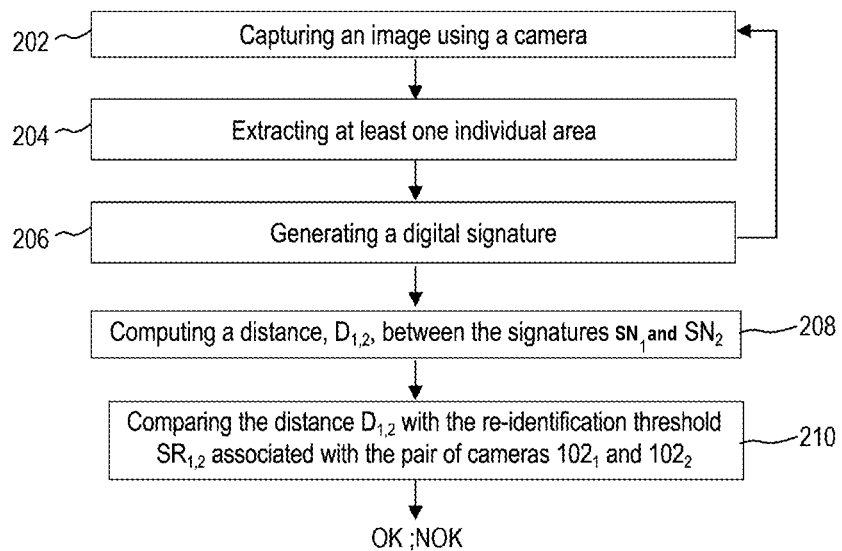
FIG. 2 is a schematic representation of a re-identification method according to one or more embodiments of the invention.

FIG. 2 is a schematic representation of a re-identification method according to one or more embodiments of the invention.

The method 200 of FIG. 2 can be used for re-identifying objects or individuals in images. Hereafter, the re-identification is considered to be individuals.

The method 200 uses an array of cameras, such as the array of cameras $102_1$-$102_3$ of FIG. 1. The method 200 can be implemented in a re-identification system according to one or more embodiments of the invention, and in particular by the system 100 of FIG. 1. Of course, the number of cameras is by no means limiting and is considered to be three in order to facilitate the description of the one or more embodiments.

The method 200 comprises a step 202 of taking a first image using a first camera, for example, $102_1$, of the array of cameras.

This image is analyzed in order to detect at least one individual therein, and to extract, for each detected individual, an area of the image comprising said individual, during a step 204. Hereafter, for the sake of simplifying the description and without loss of generality, it is considered that the image contains a single individual and that step 204 provides only one individual area.

During a step 206, for each individual, a digital signature, denoted $SN_1$, is generated by entering the area of the first image corresponding to this individual into a previously trained signature generator, such as, for example, the signature generator 108 of FIG. 1.

Steps 202-206 are carried out for a second image taken by a second camera, for example, camera $102_2$, so as to obtain a signature, denoted $SN_2$, generated for an individual found in an area of said other image corresponding to this individual.

Subsequently, during a step 208, a distance $D_{1,2}$ is computed between the signatures $SN_1$ and $SN_2$, for example, by the computer 110 of FIG. 1.

During a step 210, this distance $D_{1,2}$ is compared with the specific re-identification threshold $SR_{1,2}$ associated with the couple of cameras $\{102_1, 102_2\}$ that took the images from which the digital signatures were generated. This re-identification threshold $SR_{1,2}$ is specific to this couple of cameras $\{102_1, 102_2\}$, and is previously computed for this couple of cameras $\{102_1, 102_2\}$, in accordance with at least one embodiment of the invention. If the distance $D_{1,2} \leq SR_{1,2}$, then it is the same individual appearing in the images taken by this pair of cameras $\{102_1, 102_2\}$. Otherwise, the images do not correspond to the same individual.

Thus, in the method according to one or more embodiments of the invention, the cameras of the array of cameras are considered in pairs and the re-identification threshold is specific to each couple/pair of cameras. For example, for a third image taken by yet another camera of the array of cameras, for example, camera $102_3$, steps 202-206 are repeated in order to provide a signature $SN_3$ of an individual appearing in said third image. Subsequently, during step 208, a distance $D_{1,3}$ is computed between the signatures $SN_1$ and $SN_3$ and this distance is compared with a re-identification threshold $SR_{1,3}$ associated with the pair of cameras $\{102_1, 102_3\}$. At the same time, or in turn, a distance $D_{2,3}$ can be computed between the signatures $SN_2$ and $SN_3$ and this distance is compared with the re-identification threshold $SR_{2,3}$ associated with the pair of cameras $\{102_2, 102_3\}$. And so on . . . .

Thus, it is possible to re-identify an individual on a network comprising several cameras, by repeating the steps of the method 200 for each pair of cameras of said array of cameras.

As described above, at least one embodiment of the invention proposes using individually computed re-identification thresholds for each pair/couple of cameras of an array of cameras.

Figure 3:
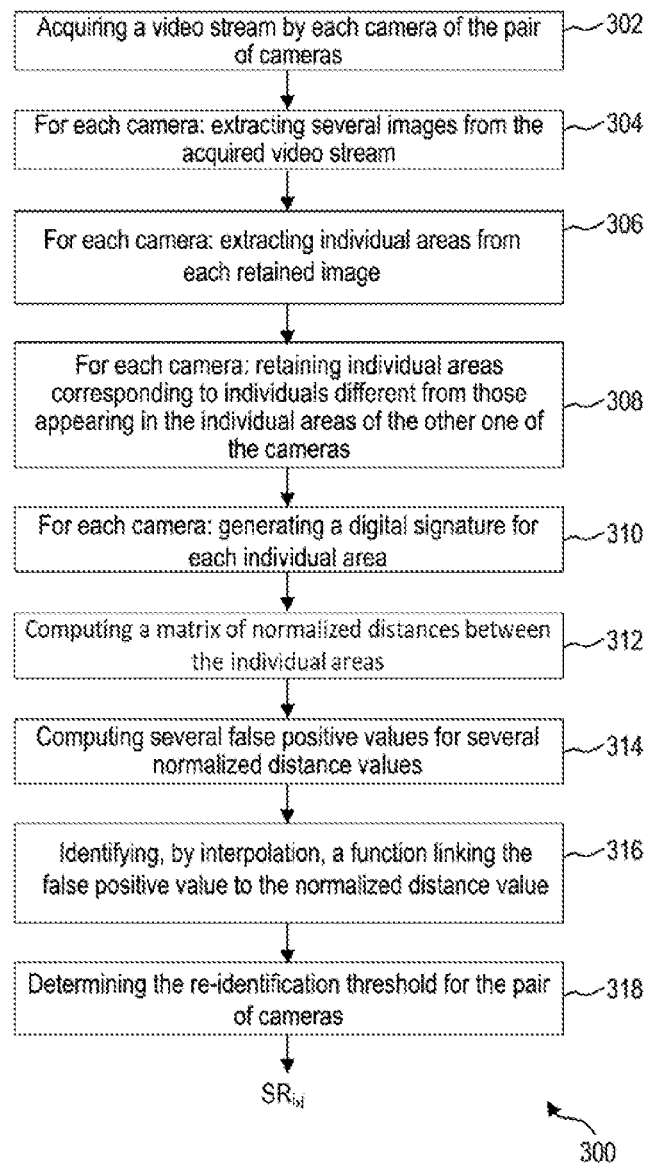
FIG. 3 is a schematic representation of a calibration method according to one or more embodiments of the invention.

FIG. 3 is a schematic representation of a calibration method according to one or more embodiments of the invention.

The method 300 allows individual re-identification thresholds to be determined for each couple/pair of cameras of an array of cameras comprising several cameras, so as to determine an individual re-identification threshold specific to each couple/pair of cameras. The method 300 can be used to determine the re-identification thresholds, $S_{1,2}$, $S_{1,3}$, and $S_{2,3}$, used in the system 100 of FIG. 1 and/or in the method 200 of FIG. 2, and more generally each re-identification threshold, denoted $S_{i,j}$, for a pair of cameras $\{102_i, 102_j\}$.

The method 300 is carried out for each pair of cameras of the array of cameras. When the array of cameras comprises at least three cameras, said cameras are considered in pairs, so that there are three pairs of cameras. According to a general definition, when the array comprises K cameras, then $(K \times (K-1)))/2$ pairs of cameras exist. The method 300 is carried out, in turn or at the same time, for each of the $(K \times (K-1)))/2$ pairs of cameras in order to identify the re-identification threshold for each pair of cameras.

The method 300 comprises a step 302 during which each camera of a pair of cameras takes a video stream with a predetermined duration, for example, 20 minutes.

During a step 304, several images are extracted from the video stream taken by each camera of the pair of cameras. For example, one image is extracted, every 5 seconds, which, for a 20 minute video stream, provides 240 images for each camera.

During a step 306, each of the 240 images originating from each camera is analyzed in order to detect individuals therein, for example, using a yolov5 type detector, such as any of the detectors $106_1$-$106_3$ of FIG. 1. Thus, for example, for each of the 240 images, many individual areas are provided. These individual areas are stored in a memory.

During a step 308, each individual area obtained for one camera of the pair of cameras, is compared with each image area of the other camera of the pair of cameras, in order to eliminate individual areas corresponding to the same individual. This comparison can be carried out by an operator who is shown the individual areas. Thus, at the end of step 308, for each camera of the pair of cameras, only the individual areas corresponding to individuals different from those appearing in the individual areas of the other camera of the pair of cameras are retained. For example, at the end of step 308 a vector of "N" image areas is retained for one of the cameras of the pair of cameras, and a vector of "M" image areas are retained for the other one of the cameras of the pair of cameras.

During a step 310, for each of the retained individual areas, a digital signature is generated by a signature generator, for example, by a previously trained CNN neural network, in particular by a signature generator similar or identical to any one of the signature generators $108_1$-$108_3$ of FIG. 1. Thus, a vector of N digital signatures is obtained for one of the cameras of the pair of cameras and a vector of M digital signatures is obtained for the other one of the cameras of the pair of cameras.

During a step 312, for each individual area detected for one of the cameras of the pair of cameras, a normalized distance is computed between the digital signature of said individual area with the signature of each of the individual areas of the other camera of the pair of cameras. The computed distance between two signatures can be the normalized cosine distance. The distance can be computed, for example, by any one of the computers 110 of FIG. 1. Thus, at the end of step 312, a matrix of N×M distances is obtained.

During a step 314, several false positive values are computed for several normalized distance values. For example, a false positive value can be computed for each normalized distance in steps of 0.1: 0.1, 0.2, 0.3, etc. For a normalized distance value, the number of false positives corresponds to the number of normalized distances greater than or equal to said normalized distance value in the N×M matrix computed during step 312.

During a step 316, a function f linking the number of false positives to the normalized distance is identified by interpolating the data obtained in step 314. Such a function f can be identified using any interpolation, in particular by univariate interpolation, and, for example, by the interpolation function described on SciPy for scipy.interpolate under interp1d.

During a step 318, the individual and specific re-identification threshold for the pair of cameras can be selected for a given false positive value. According to at least one embodiment, the re-identification threshold can be selected as the normalized distance corresponding to a false positive value selected by the user, provided by the function f identified during step 316.

The steps of the method are repeated for each pair of cameras. Some steps of the method 300 can be common for multiple iterations. For example, for each camera, steps 302-306 can be carried out once and be reused by each pair in which this camera appears.

Figure 4:
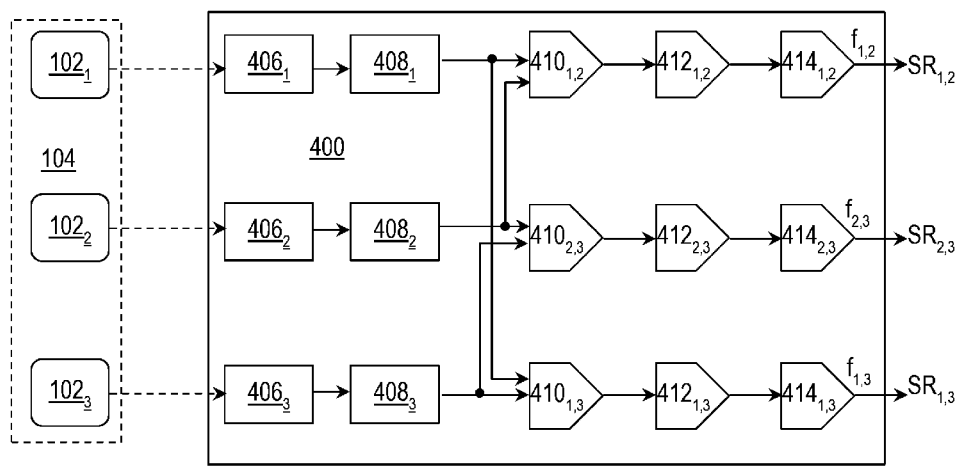
FIG. 4 is a schematic representation of a calibration device according to one or more embodiments of the invention.

FIG. 4 is a schematic representation of a calibration device according to one or more embodiments of the invention.

The calibration device 400 can be used to determine the re-identification thresholds $S_{i,j}$ used in the system 100 of FIG. 1 and/or in the method 200 of FIG. 2. In particular, the calibration device 400 can be integrated into the system 100 of FIG. 1 and can use some of the elements of said system 100.

The device 400 can be used to calibrate a re-identification system comprising an array of K cameras $102_1$-$102_K$ distributed in space and forming an array 104 of cameras, with K≥2. In at least one embodiment as shown in FIG. 4, and without loss of generality, K=3.

Each camera $102_1$-$102_3$ takes a video stream with a predetermined duration, for example, 20 minutes, and transmits it to the calibration device 400. Each image of the video stream taken by a camera can be analyzed. Alternatively, for each stream, only one image every E seconds can be processed. For example, E=5 seconds.

The device 400 comprises, for each camera $102_1$-$102_3$, an individual detector, respectively $406_1$-$406_3$, in each processed image. Each individual detector $406_1$-$406_3$ can be a yolov5 type detector previously trained for detecting individuals. Each detector $406_1$-$406_3$ allows one or more individuals to be detected in an image, and allows, for each detected individual, the area of the image comprising said individual to be isolated and supplied. Generally, the individual area is a rectangular area comprising said individual. According to at least one embodiment, when the device 400 is integrated into the system 100 of FIG. 1, the detectors $406_1$-$406_3$ can be the detectors $106_1$-$106_3$. Of course, the device 400 can comprise a single detector 406 used in turn for each camera $102_1$-$102_3$.

The device 400 comprises, for each camera $102_1$-$102_3$, a signature generator $408_1$-$408_3$, which takes an area of an image comprising an individual as input, and provides a digital signature, denoted SN, for this individual as output. Each signature generator $408_1$-$408_3$ can conventionally comprise a previously trained neural network CNN. According to at least one embodiment, when the device 400 is integrated into the system 100 of FIG. 1, the generators $408_1$-$408_3$ can be generators $108_1$-$108_3$. Of course, the device 400 can comprise a single signature generator 408 used in turn for each camera $102_1$-$102_3$.

The device 400 further comprises, for each pair of cameras $\{102_i, 102_j\}$, a computer, respectively $410_{1,2}$, $410_{1,3}$, $410_{2,3}$, for computing the distance, for example, the cosine distance, normalized between:
  a digital signature generated for each individual area originating from the camera $102_i$; and a digital signature generated for each individual area originating from the camera $102_j$;

where i≠j, and i,j≤K. The computed distance can be a normalized distance with a value ranging between 0 and 1. According to at least one embodiment, when the device 400 is integrated into the system 100 of FIG. 1, the computers $410_{1,2}$, $410_{1,3}$, $410_{2,3}$ can be the computers $110_{1,2}$, $110_{1,3}$, $10_{2,3}$, respectively. Of course, alternatively, a single computer 410 can be used, in turn, for each pair of cameras.

The device 400 further comprises, for each pair of cameras $\{102_i, 102_j\}$, a computer, respectively $412_{1,2}$, $412_{1,3}$, $412_{2,3}$, for computing false positive rates for various values of normalized distances, as described above with reference to step 314, for example. Of course, alternatively, a single computer 412 can be used, in turn, for each pair of cameras.

The device 400 further comprises, for each pair of cameras $\{102_i, 102_j\}$, a computer, respectively $414_{1,2}$, $414_{1,3}$, $414_{2,3}$, for computing, by interpolation, a function, respectively $f_{1,2}$, $f_{1,3}$ and $f_{2,3}$, linking the false positive rate to the normalized distance, as described above with reference to step 316, for example. Of course, alternatively, a single computer 414 can be used, in turn, for each pair of cameras.

For each pair of cameras, the function, $f_{1,2}$, $f_{1,3}$ and $f_{2,3}$ respectively, is used to provide the re-identification threshold, $SR_{1,2}$, $SR_{1,3}$ and $SR_{2,3}$ respectively, associated with said pair of cameras.

Each of the described modules, by way of one or more embodiments, can be a hardware module, for example, a computer chip, a processor, etc., or, preferentially, a software module. Each of the modules can be an independent module, or can be integrated with at least one other module.

Of course, the invention is not limited to the one or more embodiments disclosed above. For example, the number of cameras is not limited to 3. Furthermore, the number of images or the duration of the video streams are provided solely by way of examples, without loss of generality.

The invention claimed is:

1. An object re-identification method for an object re-identification system including an array of cameras, wherein for at least one pair of two cameras from among said array of cameras, said object re-identification method comprises:
   a calibration stage comprising
      detecting objects in images taken by each camera of the at least one pair of two cameras;
      for each combination of two cameras of the at least one pair of two cameras,
         determining whether a first object of said objects of a first image of said images detected by a first camera of the two cameras is a same object or different objects than that of a second object of said objects of a second image of said images detected by a second camera of the two cameras;
         retaining only areas of the first image and the second image corresponding to said different objects as individual retained areas, wherein a vector of N image areas is retained for the first camera and a vector of M images is retained for the second camera;
         for each retained area of the individual retained areas, generating a digital signature of the retained area;
         computing a normalized distance between each digital signature of said each retained area of the individual retained areas, such that a matrix of N×M normalized distances of all of the individual retained areas is computed;
         computing several false positive rates for several normalized distance values, each false positive rate of said several false positive rates based on each normalized distance of said normalized distance that is computed for said each retained area, wherein said each false positive rate of said several false positive rates is associated with a normalized distance threshold;

determining, by interpolating said several false positive rates and said normalized distance threshold of said each false positive rate, a function linking the each false positive rate to the normalized distance threshold associated therewith; and computing a re-identification threshold by virtue of said function taking a predetermined false positive rate as input and selecting said re-identification threshold as a normalized distance corresponding to the predetermined false positive rate, provided by said function; and calibrating said object re-identification system and reducing a number of false positives and false negatives, based on said re-identification threshold for said each combination of two cameras of the at least one pair of two cameras, wherein said re-identification threshold is used to re-identify one or more objects in further images taken by said each camera of the at least one pair of two cameras.

2. The object re-identification method according to claim 1, wherein the function is determined by univariate interpolation linking the each false positive rate to the normalized distance threshold associated therewith, such that $$\Gamma = f(RFP),$$

where $\Gamma$ is the normalized distance threshold, and RFP a false positive rate.

3. The object re-identification method according to claim 1, wherein, for at least one image of the images, the detecting the objects uses an object detector to extract an area of said at least one image comprising said objects.

4. The object re-identification method according to claim 1, wherein said each digital signature of said each retained area are computed by a generator comprising a previously trained neural network.

5. The object re-identification method according to claim 1, wherein said object re-identification method is carried out for each camera of said array of cameras with each of other cameras of said array of cameras, to obtain a re-identification threshold for each pair of cameras of said array of cameras.

6. The object re-identification method according to claim 1, wherein said objects comprise individuals.

7. The object re-identification method according to claim 1, further comprising re-identifying an object of said objects in said images taken by said array of cameras, using a re-identification threshold associated with another pair of cameras of said at least one pair of two cameras of said array of cameras, determined by said object re-identification method.

8. A non-transitory computer-readable medium storing a computer program comprising executable instructions, which, when the executable instructions are executed by a computer device, cause the computer device to carry our an object re-identification method for an object re-identification system including an array of cameras, wherein for at least one pair of two cameras from among said array of cameras, said object re-identification method comprises:

a calibration stage comprising
detecting objects in images taken by each camera of the at least one pair of two cameras;

for each combination of two cameras of the at least one pair of two cameras, determining whether a first object of said objects of a first image of said images detected by a first camera of the two cameras is a same object or different objects than that of a second object of said objects of a second image of said images detected by a second camera of the two cameras;

retaining only areas of the first image and the second image corresponding to said different objects as individual retained areas, wherein a vector of N image areas is retained for the first camera and a vector of M images is retained for the second camera;

for each retained area of the individual retained areas, generating a digital signature of the retained area;

computing a normalized distance between each digital signature of said each retained area of the individual retained areas, such that a matrix of N×M normalized distances of all of the individual retained areas is computed;

computing several false positive rates for several normalized distance values, each false positive rate of said several false positive rates based on each normalized distance of said normalized distance that is computed for said each retained area, wherein said each false positive rate of said several false positive rates is associated with a normalized distance threshold;

determining, by interpolating said several false positive rates and said normalized distance threshold of said each false positive rate, a function linking the each false positive rate to the normalized distance threshold associated therewith; and computing a re-identification threshold by virtue of said function taking a predetermined false positive rate as input and selecting said re-identification threshold as a normalized distance corresponding to the predetermined false positive rate, provided by said function; and calibrating said object re-identification system and reducing a number of false positives and false negatives, based on said re-identification threshold for said each combination of two cameras of the at least one pair of two cameras, wherein said re-identification threshold is used to re-identify one or more objects in further images taken by said each camera of the at least one pair of two cameras.

9. A system that calibrates an object re-identification system including an array of cameras and that re-identifies an object using at least one re-identification threshold associated with a pair of cameras of said array of cameras, said system comprising:

a calibration device comprising, for said pair of cameras,
a detector corresponding to each camera of said pair of cameras of said array of cameras, wherein said detector corresponding to said each camera of said pair of cameras is configured to detect objects in images taken by said each camera of said pair of cameras, determine whether a first object of said objects of a first image of said images detected by a first camera of the pair of cameras is a same object or different objects than that of a second object of said objects of a second image of said images detected by a second camera of the pair of cameras, and retain only areas of the first image and the second image corresponding to said different objects as individual retained areas, wherein a vector of N image areas is retained for the first camera and a vector of M images is retained for the second camera;

a generator comprising a previously trained neural network configured to, for each retained area of the individual retained areas, generate a digital signature of said retained area;

a computer configured to compute a normalized distance between each digital signature of said each retained area of the individual retained areas, such that a matrix of N×M normalized distances of all of the individual retained areas is computed;

a second computer configured to compute several false positive rates for several normalized distance values, each false positive rate of said several false positive rates based on each normalized distance of said normalized distance that is computed for said each retained area, wherein said each false positive rate of said several false positive rates is associated with a normalized distance threshold;

determine, by interpolating said several false positive rates and said normalized distance threshold of said each false positive rate, a function linking the each false positive rate to the normalized distance threshold associated therewith; and compute a re-identification threshold by virtue of said function taking a predetermined false positive rate as input and selecting said re-identification threshold as a normalized distance corresponding to the predetermined false positive rate, provided by said function; and a calibration device that calibrates said object re-identification system and reduces a number of false positives and false negatives, based on said re-identification threshold for said pair of cameras, wherein said re-identification threshold is used to re-identify objects in further images taken by said each camera of the pair of cameras.

* * * * *